March 12, 1929.                L. V. MALLORY                1,704,984
                              ADVERTISING DEVICE
                           Filed Feb. 17, 1927            3 Sheets-Sheet 1
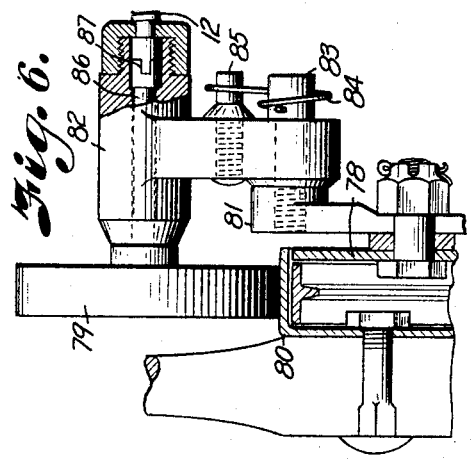
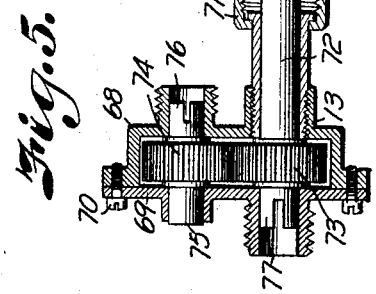
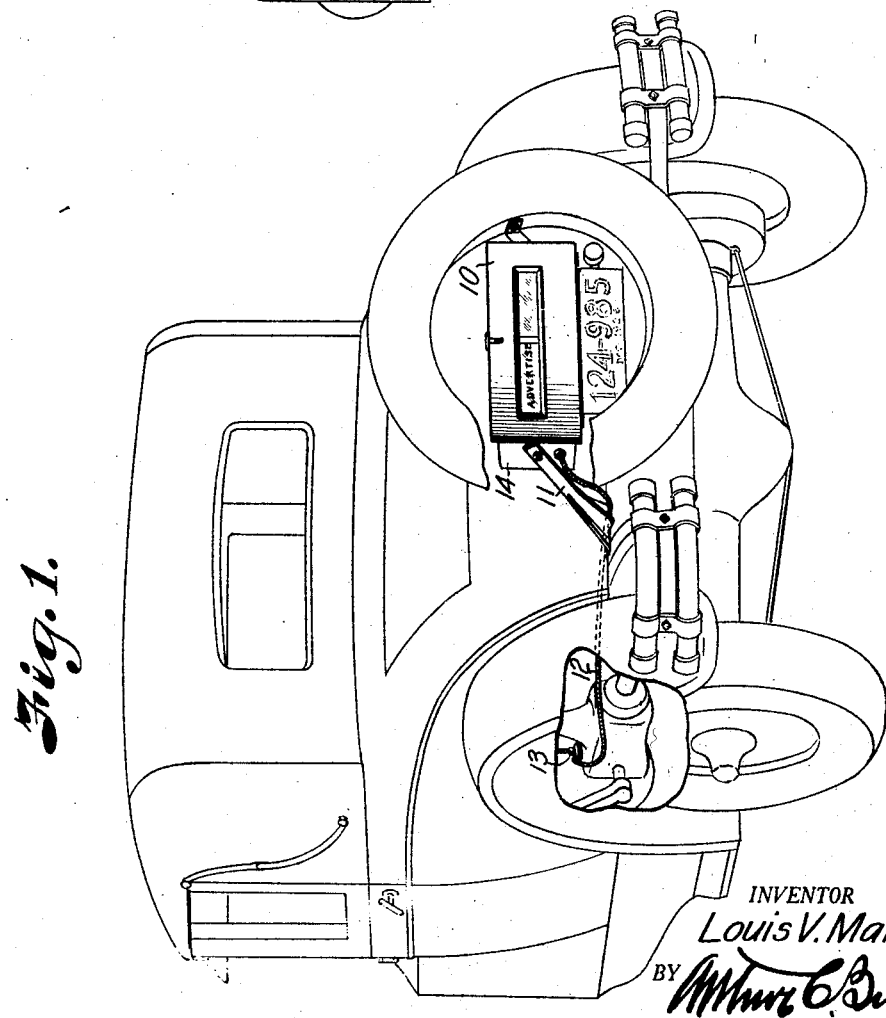
INVENTOR
Louis V. Mallory.
BY
ATTORNEY

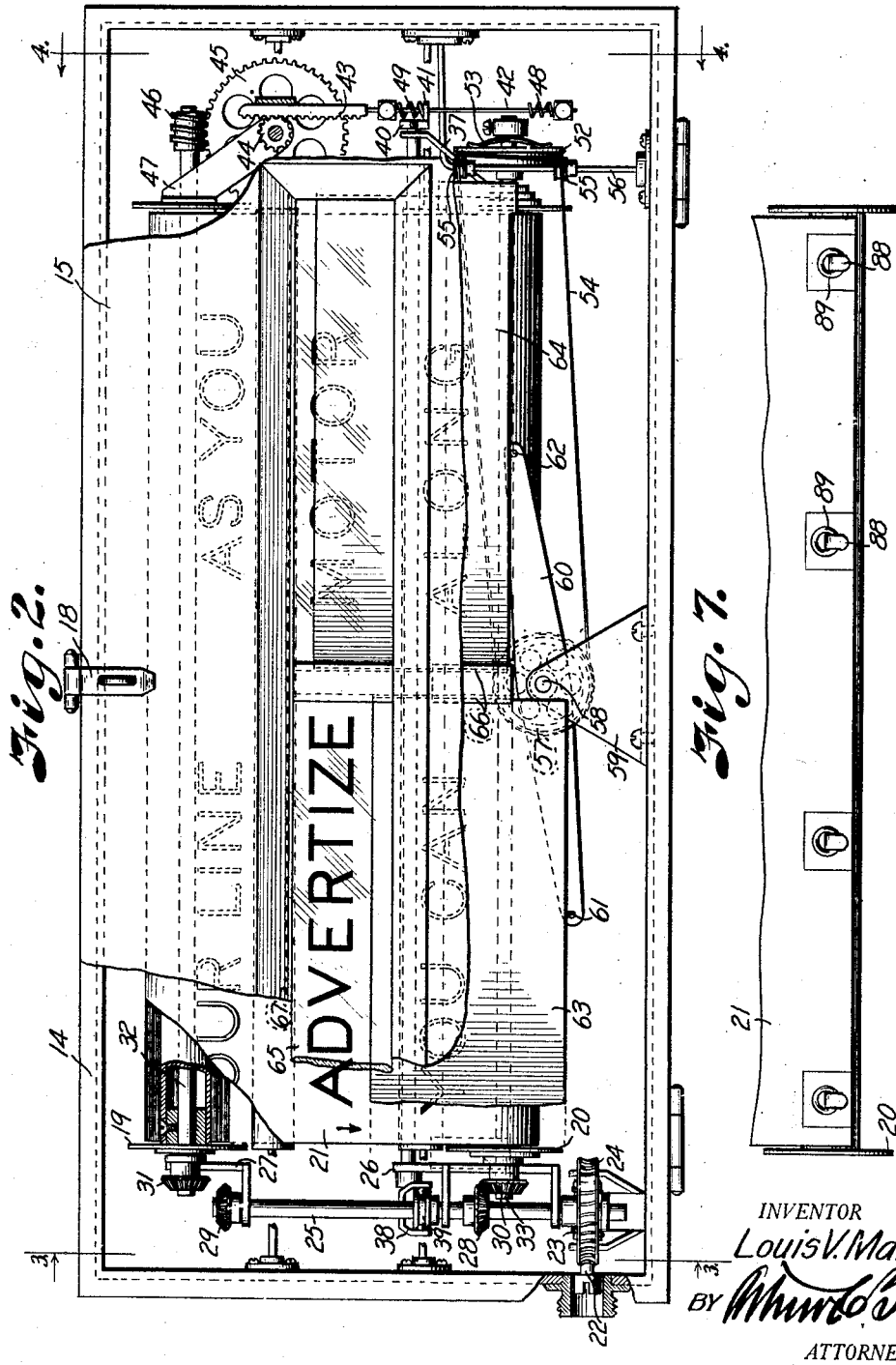

March 12, 1929.   L. V. MALLORY   1,704,984
ADVERTISING DEVICE
Filed Feb. 17, 1927   3 Sheets-Sheet 3
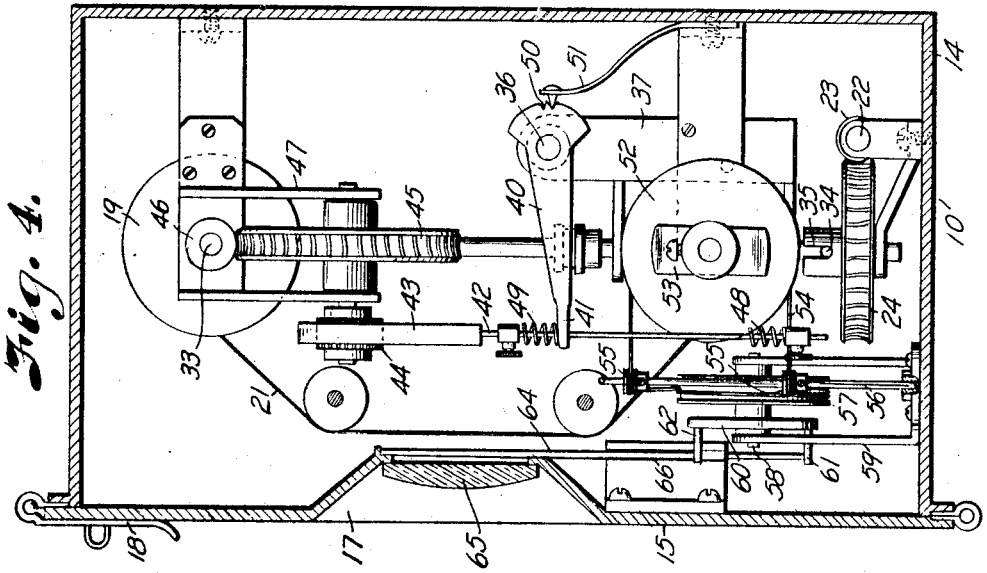
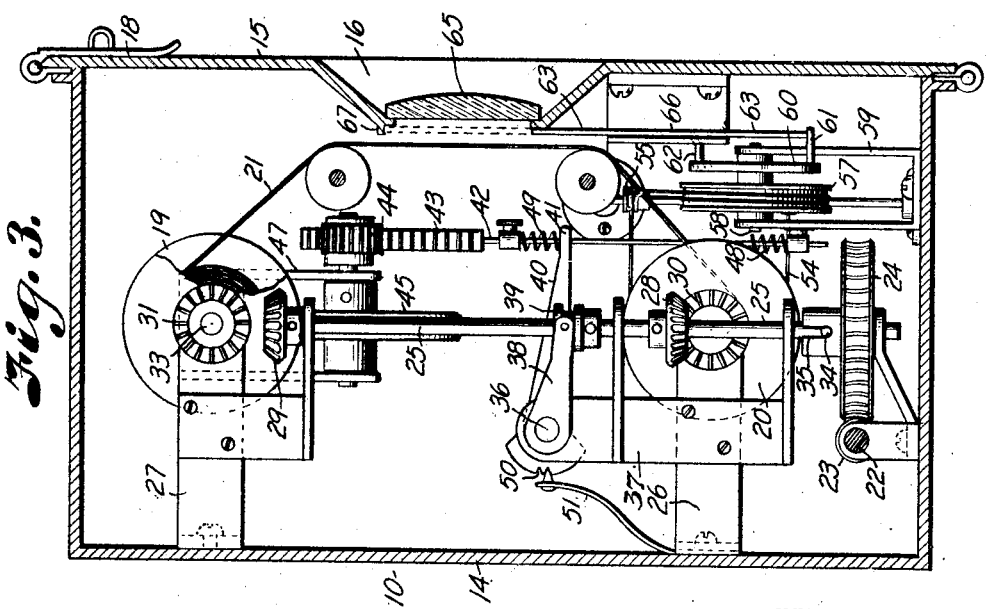
INVENTOR
Louis V. Mallory
BY
ATTORNEY Patented Mar. 12, 1929.

1,704,984

UNITED STATES PATENT OFFICE.

LOUIS V. MALLORY, OF LEXA, ARKANSAS, ASSIGNOR OF ONE-HALF TO R. F. BEST, OF KANSAS CITY, MISSOURI.

ADVERTISING DEVICE.

Application filed February 17, 1927. Serial No. 168,955.

The invention relates to advertising devices and has as one of its principal objects the provision of a construction employing a traveling ribbon for carrying a worded advertisement, with the reading matter arranged on different portions of the face thereof so as to provide for continuous reading of one portion with the other without confusion, upon the winding and rewinding of the ribbon.

It is an additional object of the invention to arrange the reading matter upon opposite sides of the center of one face of the ribbon and to provide means whereby the reading matter of one side of said face is disclosed and the other hidden from view during the travel of the ribbon, the latter being disclosed to and the former hidden from view upon travel of the ribbon a prescribed distance in opposite directions.

It is a further object to provide means whereby the ribbon is automatically caused to be reversed in its travel and to automatically have one portion thereof hidden from view and the other exposed upon this reversal of movement.

It is a feature of the invention to provide a means for connecting the device above referred to with some convenient portion of a motor vehicle to cause the actuation of the device.

The invention has these and other objects, all of which will be more readily understood when read in conjunction with the accompanying drawings which illustrate one embodiment of which the invention is susceptible, it being obvious that changes and modifications may be resorted to without departing from the spirit of the appended claims forming a part hereof.

In the drawings:

Fig. 1 is a perspective view of an automobile having the device applied thereto and connected for operation by the mechanism through which the speedometer is actuated.

Fig. 2 is a front view of the device, portions being broken away and shown in section for the purpose of illustration.

Fig. 3 is a section taken on the line 3—3 of Fig. 2.

Fig. 4 is a section taken on the line 4—4 of Fig. 2.

Fig. 5 is a detail sectional view of a means employed for forming the connection between the speedometer driving mechanism, speedometer shaft and the shaft for driving the display mechanism.

Fig. 6 is a modified construction which is adapted to be applied to and be actuated by elements of a brake drum of an automobile.

Fig. 7 is a detail front elevation of a means for attaching the opposite ends of the ribbon to the rollers upon which the ribbon is wound.

In the embodiment of the invention shown in Fig. 1 the device generally designated 10 is adapted to be carried by a bracket 11 secured to the rear of the vehicle and to be connected through the medium of the flexible shaft 12 to an element 13 of the device illustrated in Fig. 5, from which it will be evident that, as the vehicle is driven, motion will be imparted through the medium of the flexible shaft 12 to certain mechanism housed within the casing 14 of the device 10. The casing 10 is provided with a closure 15 having sight openings 16 and 17, the closure being adapted to be held in closed relation by the latch 18.

Rollers 19 and 20 are arranged within the casing and are provided to produce a means upon and from which the ribbon 21 may be wound and unwound. The ribbon 21 has one face thereof provided with reading matter arranged upon opposite sides of the center line of the ribbon. The structure of the mechanism for cooperating with the ribbon being such that the reading matter on one side only of the center of the ribbon is exposed, while the other is hidden from view so that, for instance, as the ribbon travels in a downward direction, the reading matter provided thereon to the left of Fig. 2 will be brought into view and the reading matter on the opposite side or to the right of the center line as viewed in Fig. 2 is hidden from view until the ribbon 21 has traveled a certain predetermined distance in the first named direction at which time the last mentioned reading matter, or that to the right of Fig. 2 is disclosed the reading matter to the left of Fig. 2 is hidden.

A means is provided for causing the ribbon 21 to be driven. This means includes the stub shaft 22 which is adapted to be connected to the flexible shaft 12. This stub shaft is provided with a worm 23 for engagement with a worm wheel 24 mounted upon the vertically arranged shaft 25. This shaft 25 is supported by means of the brackets 26 and 27 which, as seen from an inspection of Fig. 3, are respectively connected to the rear wall of the casing.

The shaft 25 is provided with oppositely facing beveled gears 28 and 29, which are adapted to respectively cooperate with beveled gears 30 and 31 carried by the shafts 32 and 33 of the respective rollers 19 and 20. The shaft 25 is vertically reciprocable with respect to the brackets 26 and 27 and is provided with a pin 34 which operates in the elongated opening 35 provided in the hub of the worm wheel 24 to cause rotation of said shaft.

Means is provided for causing the reciprocation of the shaft 25 so as to arrange the pinions 28 and 29 to respectively mesh with the pinions 30 and 31 of the rollers. This means includes the longitudinally arranged shaft 36, supported by the bracket 26 and a bracket 37 arranged at the opposite end of the casing.

The shaft 36 is provided with an arm 38 which engages the collar 39 arranged upon the vertically reciprocal shaft 25 and has an annular groove therein for the reception of projections extending from the arm 38. The opposite end of said shaft 36 is supplied with an arm 40 having an apertured projection 41 for the reception of the slide rod 42.

The slide rod 42 is formed to provide a rack 43 which cooperates with a pinion 44 carried by the bracket 47. The shaft of the pinion 44 has a worm wheel 45 connected thereto which meshes with a worm wheel 46 provided upon this end of the shaft 32 of the roller 19, from which it is evident that as the stub shaft 22 is actuated, rotative motion is imparted to the shaft 25, which, when the pinion 28 is in mesh with the pinon 30, causes the ribbon 21 to be driven in a downward direction causing the words or legends provided on the left side of the ribbon to be consecutively brought into register with the opening 16. As the ribbon is unwound from the roller 19, the shaft 32 thereof is rotated so as to rotate the worm 46 in the opposite direction rotating the worm wheel 45 and gear 44 causing the rack 43 on the slide rod 42 to be moved upwardly until engagement is effected between the cushion spring 48 and the extension 41 of the arm 40. Continued movement of the rack and rod in an upward direction causes the shaft 36 to be rocked, and, since the arm 38 is connected to the shaft 36, this upward movement will be transmitted to the shaft 25 causing disengagement of the pinions 28 and 30 and engagement of the pinions 29 and 31.

With the mechanism just described, in the position just referred to, it is manifest that the roller 19 will be rotated so as to take up the ribbon previously wound upon the roller 20 which will arrange the wording provided upon the face of the ribbon to the right thereof so that it may be brought into view and be read through the opening 17 when certain other devices subsequently to be explained are arranged to permit of this.

It is, of course, understood that when the ribbon is being wound upon the roller 19 that the shaft 32 thereof is rotated in the opposite direction from that previously referred to, which will cause the rack 43 and vertically reciprocal rod 42 to be moved in a downward direction until the spring 49 of the stop device provided upon the rod 42 is brought into engagement with the projection 41 of the arm 40, which will move the arm in a downward direction and again cause the shaft 25 and the elements connected thereto to assume the position shown in Fig. 2. The arm 40 is provided with a plurality of notches 50 with which the spring detent 51 is adapted to cooperate to hold the arm and various elements connected therewith in an upward and downward position.

As before stated, a means is provided for alternately closing and exposing the sight openings 16 and 17 so as to alternately permit the matter on opposite sides of the center of the ribbon to be viewed. This means includes a drum 52 loosely mounted upon the shaft 33 of the lower roller 20, which provides one part of a friction clutch of which the spring element 53 is a part. This drum has a cord or endless cable 54 wound thereon and which extends over idlers 55—55 carried by the bracket 56 and thence therefrom over a drum 57 mounted upon the shaft 58 carried by the bracket 59.

An arm 60 is mounted upon the shaft 58 and projects in opposite directions from the shaft and has its opposite ends respectively provided with pins 61 and 62 for engagement with slidable shutters 63 and 64 which are adapted to alternately open and close the sight openings 16 and 17 when the ribbon reaches a prescribed portion of travel. These shutters 63 and 64 are arranged in the rear of the glass 65 which is arranged over the openings and said shutters are adapted to slide between the movable ribbon and the sight openings in guideways 66, the shutters being brought to rest upon engagement with the stop 67 formed by a longitudinally inwardly projecting flange located adjacent the top of the sight openings.

From the foregoing description of the mechanism just referred to, it is evident that as the roller 20 is moved in opposite directions, that the cord or cable 54 will have one length thereof wound upon and the other length thereof let off from the drum 52 which will cause the arm 60 to be rocked on its pivot causing one end thereof to be raised and the other lowered, which results in raising and lowering the shutters 63 and 64.

It is further evident that the shutter which is being raised will be elevated until it engages with the flange or extension 67 providing the stop and that continued rotation of the roller is permitted by virtue of the slip or friction clutch including the drum 52 and the spring 53.

The device 13 illustrated in Fig. 3 is as before stated provided to afford a connection between the mechanism for driving the speedometer shaft. This device is therefore provided with a means for affording a connection between the speedometer shaft actuating mechanism, said speedometer shaft and the flexible shaft 12 employed to actuate the mechanism contained in the casing 10.

The device includes a casing composed of two sections 68 and 69 which are held together by the cap screws 70 and is provided with a means such as 71 whereby the shaft 72 may be connected to the shaft of the speedometer driving mechanism. This shaft has a gear 73 provided thereon which meshes with a gear 74 having the shaft 75. One end such as 76 of the shaft 75 is adapted for connection to the flexible shaft 12 and an end such as 77 of the shaft 72 is formed to provide for a driving connection between it and the flexible shaft of the speedometer. From this explanation it is evident that a means is provided for driving the device, forming the subject matter of this application, by means of the mechanism through which the speedometer of the vehicle is actuated.

In Fig. 6 a modified construction for transmitting motion from the vehicle through the flexible shaft 12 to the device to be actuated thereto is illustrated. The means shown in this figure is adapted to be connected to and supported by a bracket with a stationary part 78 of a brake housing and to be arranged so that a driving wheel 79 thereof may engage with the rotatable portion 80 of said housing and thereby transmit motion to the flexible shaft 12. To this end the device illustrated in Fig. 6 is provided with bracket 81 which is mounted stationarily with respect to the stationary part 78 of the brake housing and provides a means of support for an element 82 which is pivotally mounted on the extension 83, upon the latter of which a coiled spring 84 is arranged and held with a free end thereof in engagement with a pin or extension 85 provided upon the pivoted member 82. This mechanism will maintain the proper frictional contact between the drive 79 and the part 80 of the brake housing. The shaft 86 of this mechanism is provided with a notched end 87 for the reception of a tongue which extends from a part of the flexible shaft 12. The arrangement just described provides an arrangement whereby the mechanism confined in the casing 10 may be actuated by virtue of a connection with an element of a wheel.

In Fig. 7 is illustrated a means whereby the ribbon may be interchangeably associated with said rollers and consists of fingers 88 secured to the rollers which enter opening 89 provided in the opposite end of the ribbon.

In the foregoing description of the construction and operation, it is manifest that a construction is provided whereby reading matter provided upon one face of and upon opposite sides of the center of a ribbon may be alternately brought into and out of view and thereby permit continuous reading of matter provided upon opposite sides of the center of the ribbon and that a mechanism is provided whereby this may be continuously and consecutively accomplished while the vehicle is in motion and needs no further attention by the user.

What I claim and desire to secure by Letters Patent is:

1. In a device of the character described, the combination of a casing having an opening therein, a movable member having reading matter provided thereon and arranged upon opposite sides of the center of a face thereof, means for moving said member first in one direction, then in the other direction across said opening, means for exposing the matter on one side of said center, means for obscuring the matter upon the other side of the center and means automatically operable in response to movement of said member for alternately operating said exposing and obscuring means.

2. In a device of the class described the combination of a pair of rollers, a ribbon arranged between said rollers, said rollers providing means for alternately letting off and taking up said ribbon, means for exposing a portion of said ribbon, means for obscuring another part of the ribbon, means for reversing the direction of rotation of said rollers, said last mentioned means being operable by one of said rollers, and means for actuating the means for exposing and obscuring said ribbon, said means being operable by the other roller.

3. In a device of the class described the combination of a pair of rollers, a ribbon arranged between said rollers, said rollers providing means for alternately letting off and taking up said ribbon, means for exposing a portion of said ribbon, means for obscuring another part of the ribbon, means for reversing the direction of rotation of said rollers, said last mentioned means being operable by one of said rollers, and means for actuating the means for exposing and obscuring said ribbon, said means being operable by the other roller, said last mentioned means being operable upon the actuation of the roller reversing means.

4. In a device of the character described, the combination of an indicia ribbon having sets of indicia thereon arranged for consecutive reading upon movement of the ribbon in alternate directions, means for moving the ribbon, and means operable in response to alternation of said ribbon movement automatically exposing first one set of indicia and then the other.

5. In a device of the character described, the combination of a ribbon having sets of indicia arranged to allow one set of indicia to be read upon movement of the ribbon in one direction and the other set to be read upon movement in reverse direction, rollers upon and from which the ribbon is wound, means for driving the rollers first in one direction and then in the other direction, and means responsive to reverse movements of the ribbon for alternately exposing one set of indicia and obscuring the other set of indicia.

6. In a device of the character described, the combination of a ribbon having sets of indicia arranged to allow one set of indicia to be read upon movement of the ribbon in one direction and the other set to be read upon movement in reverse direction, rollers upon and from which the ribbon is wound, means for driving the rollers first in one direction and then in the other direction, and means for alternately exposing one set of indicia and obscuring the other set of indicia operable by one of the rollers.

7. In a device of the character described, the combination of a ribbon having sets of indicia arranged to allow one set of indicia to be read upon movement of the ribbon in one direction and the other set to be read upon movement in reverse direction, rollers upon and from which the ribbon is wound, means for driving the rollers first in one direction and then in the other direction, means for alternately exposing one set of indicia and obscuring the other set of indicia, and a friction clutch in driven connection with one of the rollers to actuate the obscuring and exposing means.

8. In a device of the character described, the combination of a ribbon having sets of indicia arranged to allow one set of indicia to be read upon movement of the ribbon in one direction and the other set to be read upon movement in reverse direction, rollers upon and from which the ribbon is wound, means for driving the rollers first in one direction and then in the other direction, and means comprising shutters arranged to obscure one set of indicia and expose the other set, a friction element driven by one of the rollers, a drum in frictional engagement with the element, an arm engaging the shutters and a flexible connection extending from the drum to said arm for alternately actuating the shutters upon reverse movement of the ribbon.

In testimony whereof I affix my signature.

LOUIS V. MALLORY.